United States Patent
Bryon et al.

(10) Patent No.: US 9,588,317 B2
(45) Date of Patent: Mar. 7, 2017

(54) FIBER MANAGEMENT TRAY WITH RESTRICTED ACCESS REGION

(75) Inventors: Roel Modest Willy Bryon, Aarschot (BE); Bart Mattie Claessens, Hasselt (BE); Dirk Kempeneers, Aarschot (BE); Wouter Jan Foulon, Leuven (BE)

(73) Assignee: CommScope Connectivity Belgium BVBA, Kessel-Lo (BE)

( * ) Notice: Subject to any disclaimer, the term of this patent is extended or adjusted under 35 U.S.C. 154(b) by 609 days.

(21) Appl. No.: 14/124,344

(22) PCT Filed: Jun. 7, 2012

(86) PCT No.: PCT/EP2012/060814
§ 371 (c)(1),
(2), (4) Date: Mar. 3, 2014

(87) PCT Pub. No.: WO2012/168375
PCT Pub. Date: Dec. 13, 2012

(65) Prior Publication Data
US 2014/0193129 A1 Jul. 10, 2014

(30) Foreign Application Priority Data
Jun. 8, 2011 (EP) .................................. 11169105

(51) Int. Cl.
 *G02B 6/00* (2006.01)
 *G02B 6/44* (2006.01)
 *G02B 6/28* (2006.01)

(52) U.S. Cl.
 CPC ......... *G02B 6/4469* (2013.01); *G02B 6/4454* (2013.01); *G02B 6/2804* (2013.01); *G02B 6/4452* (2013.01)

(58) Field of Classification Search
None
See application file for complete search history.

(56) References Cited

U.S. PATENT DOCUMENTS

| | | | |
|---|---|---|---|
| 5,080,459 A | | 1/1992 | Wettengel |
| 5,361,382 A | * | 11/1994 | Nakamura ............... G02B 6/30 359/900 |

(Continued)

FOREIGN PATENT DOCUMENTS

| | | |
|---|---|---|
| EP | 0 903 594 | 3/1999 |
| WO | WO 03/087912 | 10/2003 |
| WO | WO 2012/074688 | 6/2012 |

OTHER PUBLICATIONS

International Search Report and Written Opinion from PCT/EP2012/060814 mailed Jun. 29, 2012 (9 pages).

*Primary Examiner* — Rhonda Peace
(74) *Attorney, Agent, or Firm* — Merchant & Gould P.C.

(57) ABSTRACT

A fiber management tray (20) is disclosed. The fiber management tray (20) includes a tray body (22) defining a fiber storage region (24) for storing excess optical fiber length (26). The tray body (22) also includes a splice mount (28) for mounting at least one optical splice (30). The fiber management tray (20) includes a restricted access region (32) and an unrestricted access region (34) on the tray body (22). The splice mount (28) and the fiber storage region (24) are provided at the unrestricted access region (34), and an optical splitter component (36) is provided at the restricted access region (32).

13 Claims, 4 Drawing Sheets

(56) References Cited

U.S. PATENT DOCUMENTS

| | | | |
|---|---|---|---|
| 5,375,185 A | 12/1994 | Hermsen et al. | |
| 5,553,183 A | 9/1996 | Bechamps | |
| 5,572,617 A * | 11/1996 | Bernhardt | G02B 6/4454 385/135 |
| 6,085,001 A * | 7/2000 | Belt | G02B 6/2835 385/51 |
| 6,418,264 B1 * | 7/2002 | Hough | G02B 6/4454 385/135 |
| 6,865,332 B1 * | 3/2005 | Saravanos | G02B 6/3628 385/136 |
| 7,555,176 B2 * | 6/2009 | Draxler | B32B 37/12 385/14 |
| 8,086,084 B2 * | 12/2011 | Bran de Leon | G02B 6/4454 385/134 |
| 8,913,868 B2 * | 12/2014 | Hangebrauck | G02B 6/4454 385/135 |
| 8,929,708 B2 * | 1/2015 | Pimentel | G02B 6/4441 385/135 |
| 2014/0193129 A1 * | 7/2014 | Bryon | G02B 6/4469 385/135 |
| 2015/0205064 A1 * | 7/2015 | Claessens | G02B 6/4453 385/135 |

* cited by examiner

FIBER MANAGEMENT TRAY WITH RESTRICTED ACCESS REGION

This application is a National Stage Application of PCT/EP2012/060814, filed 7 Jun. 2012, which claims benefit of Serial No. 11169105.1, filed 8 Jun. 2011 in Europe and which applications are incorporated herein by reference. To the extent appropriate, a claim of priority is made to each of the above disclosed applications.

BACKGROUND

Fiber optic communication systems are becoming prevalent in part because service providers want to deliver high bandwidth communication capabilities (e.g., data and voice) to customers. Fiber optic communication systems employ a network of fiber optic cables to transmit large volumes of data and voice signals over relatively long distances. The ability to effectively manage optical fibers and optical components is an important part of most fiber optic communication systems. Fiber management trays are often used to facilitate managing excess fiber length needed for efficiently providing optical splices between optical fibers. Fiber management trays are also used to support optical components such as optical splitters (e.g., optical power splitters and wavelength division multiplexers (WDM)) and splice sleeves. Example fiber management trays are disclosed by the following International Publication Numbers: WO 98/22842; WO 209/131895; WO 95/25978; WO 95/07480; and WO 2008/033997.

Existing fiber optic systems often use infrastructure technology including organizers having a plurality of fiber management trays pivotally connected to support modules. The support modules can be configured to connect to a frame or profile of a universal mounting system. The fiber management trays can include splice trays dedicated for providing optical splicing functionality, and separate splitter trays for providing optical splitting functionality. Because optical splitters are typically relatively fragile and prone to damage in the field, optical splitter trays can be covered thereby limiting or restricting access to the optical splitters contained therein. In this way, the optical splitters are protected from damage in the field. Splitter input fibers from the splitters of the splitter trays are generally routed to the separate splice trays where field technicians can splice the splitter input fibers to corresponding feeder fibers.

While existing fiber optic systems have proven effective, improvements are needed to provide more compact configurations while maintaining effective fiber management and also maintaining suitable protection of optical components. Improvements are also needed to provide different types of splitting and splicing options in the field to create greater system flexibility for addressing the needs of different applications.

SUMMARY

One aspect of the present disclosure relates to a fiber management tray including a tray body that defines a fiber storage region for storing excess optical fiber length. The tray body also includes a splice mount for mounting at least one optical splice. A fiber management tray includes a restricted access region and an unrestricted access region on the tray body. The splice mount and the fiber storage region are provided at the unrestricted access region. An optical splitter component is provided at the restricted access region. The optical splitter component includes a splitter input fiber and splitter output fibers. This configuration allows both the optical splitter component and the splice location for splicing the splitter input fiber to a feeder fiber to be provided on the same fiber management tray. In this way, it is not necessary for separate splice trays to be dedicated for splicing feeder fibers to splitter input fibers. Instead, splice trays can be dedicated for other applications such as splicing the splitter output fibers to outgoing fibers (e.g., drop fibers) such as fibers routed to subscriber locations. The restricted and unrestricted access regions on the tray body allow field technicians to readily access the splitter input fibers for splicing to the feeder fibers, and also allow the excess length corresponding to the splitter input fiber and the feeder fiber to be effectively managed and stored by field technicians on the tray. At the same time, the restricted access region ensures that the optical splitter component is not disturbed and remains protected. Furthermore, the restricted access region can provide an indication as to whether the optical splitter component has been disturbed for the purpose of verifying warranty claims.

In certain embodiments, the optical splitter component includes a splitter body and splitter output fibers that extend outward from the splitter body. The restricted access region can include a first portion that restricts access to the splitter body and a second portion that restricts access to the splitter output fibers. The second portion can be used to ensure that the splitter output fibers remain routed along a preferred output routing path. In this way, the second portion of the restricted access region prevents the splitter output fibers from being rerouted or otherwise manipulated in the field. In certain embodiments, the second portion of the restricted access region extends along a periphery of the tray body and occupies a relatively small amount of space such that a majority of the tray body is available for managing and storing the feeder fiber as well as the splitter input fiber at the unrestricted access region.

DETAILED DESCRIPTION

Aspects of the present disclosure relate to fiber management trays that can be used in fiber optic systems such as fiber-to-the-premises (FTTP) networks and air blown fiber networks. In certain embodiments, the fiber management trays can be used as part of a fiber management system and can be incorporated into various system components that may be used in inside or outside environments. In certain embodiments, the fiber management trays can be used at a central office, at an exchange, at a head end or at a customer premises. In other embodiments, the fiber management trays can be mounted within environmentally sealed enclosures such as street cabinets, splice closures, domes, pedestals, wall boxes or other structures adapted for outside environmental use. The fiber management trays can also be used on structures such as frames, racks, drawers, shelves, panels, closets or other structures.

Figure 1:
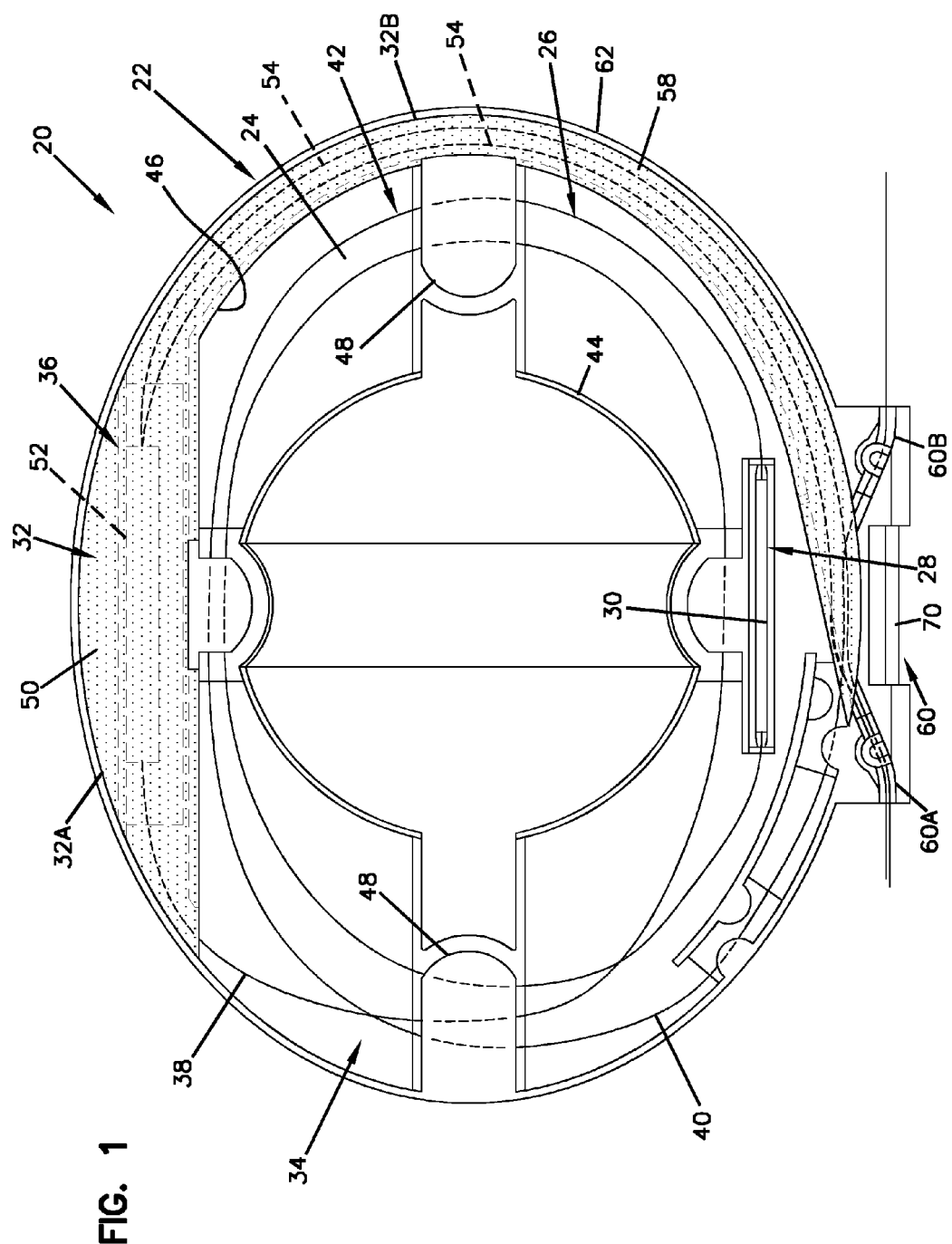
FIG. 1 is a top plan view of a fiber management tray in accordance with the principles of the present disclosure, the fiber management tray includes a restricted access region and an unrestricted access region.
Figure 2:
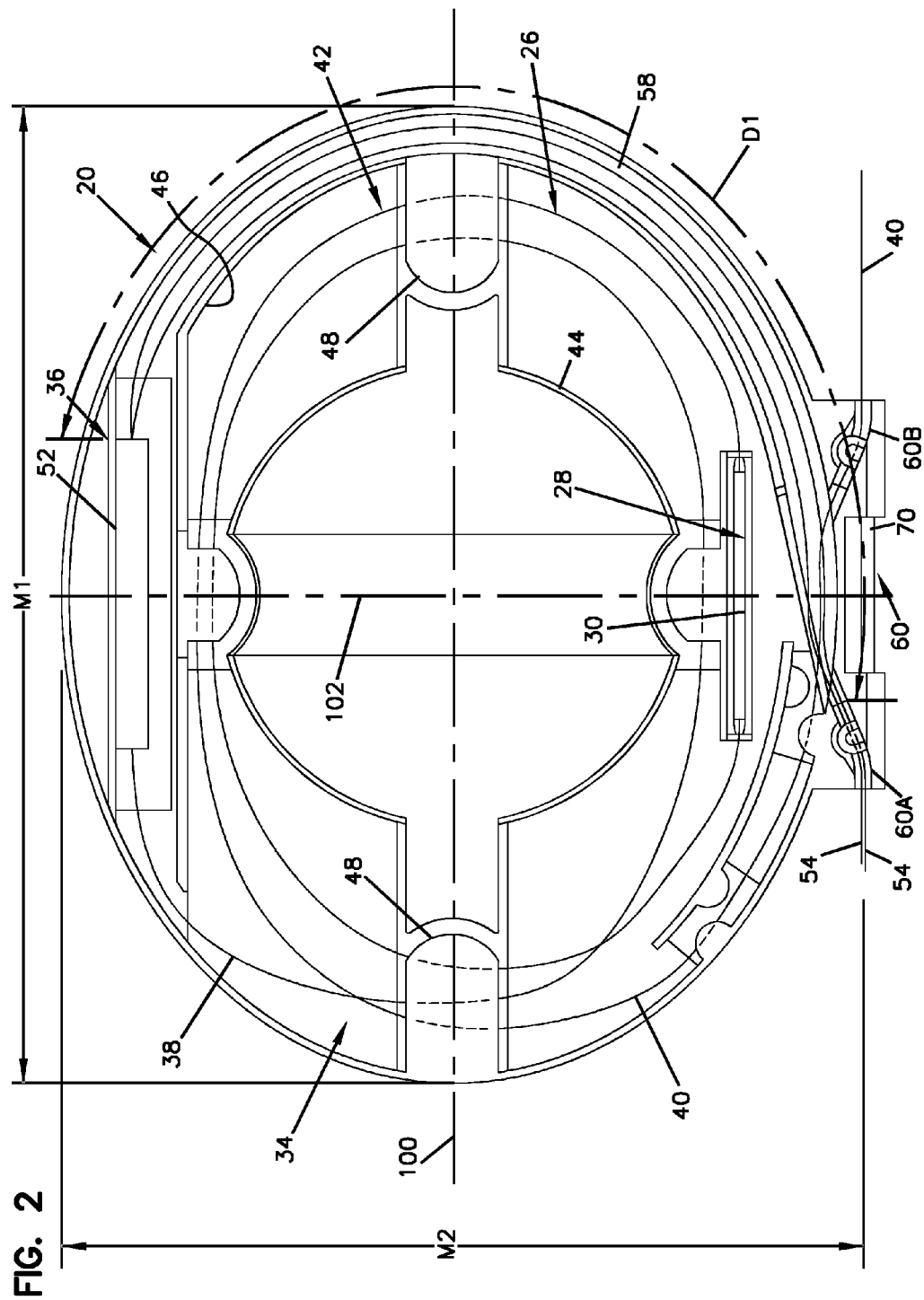
FIG. 2 shows the fiber management tray of FIG. 1 with a cover corresponding to the restricted access region removed to reveal an underlying optical splitter component including a splitter body, a splitter input fiber and splitter output fibers.
Figure 3:
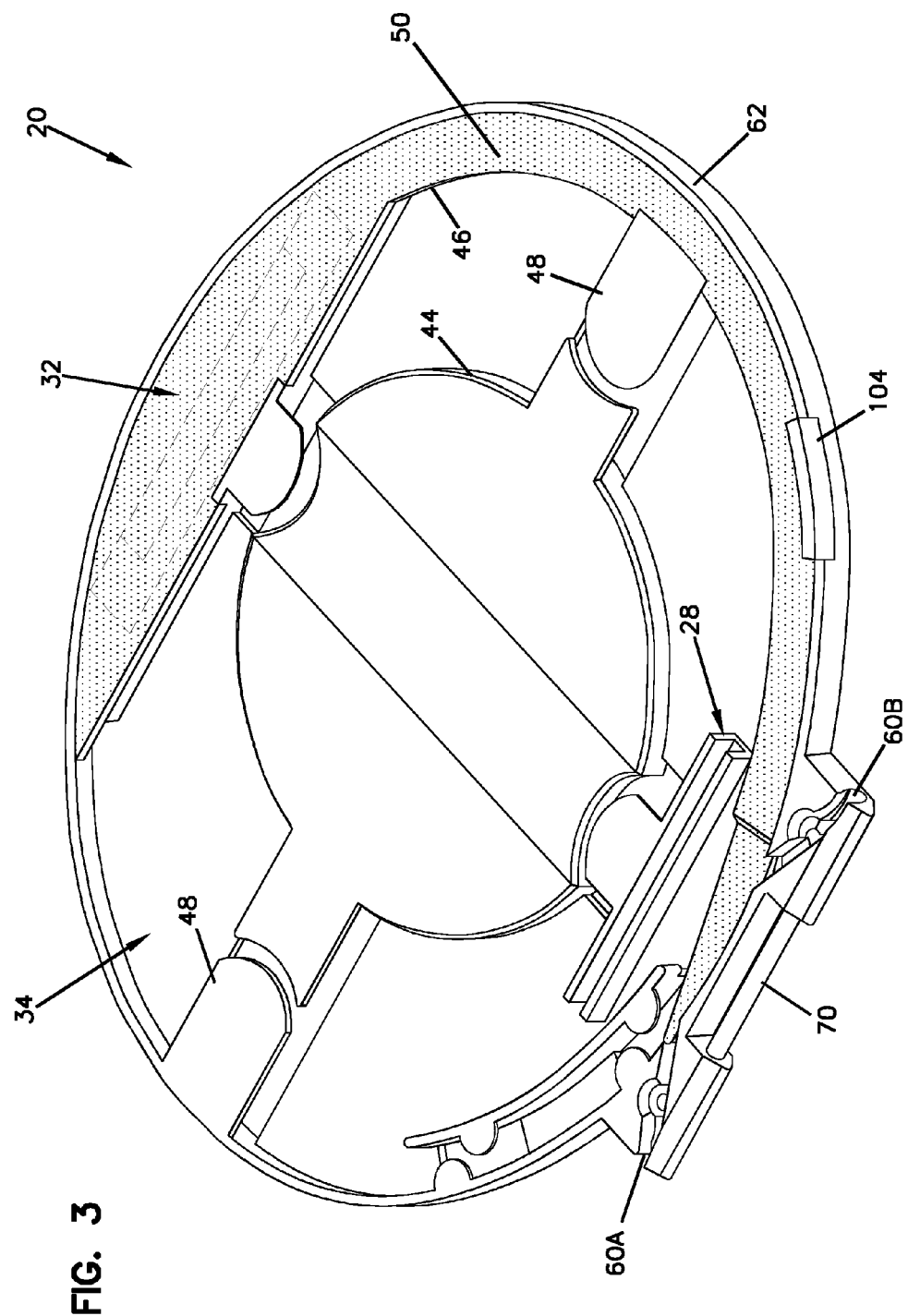
FIG. 3 is a top, perspective view of the fiber management tray of FIG. 1.

FIGS. 1-3 show a fiber management tray 20 in accordance with the principles of the present disclosure. The fiber management tray 20 includes a tray body 22 defining a fiber storage region 24 for storing excess optical fiber length 26. The tray body 22 also includes a splice mount 28 for mounting at least one optical splice 30 (e.g., a splice sleeve). The fiber management tray 20 includes a restricted access region 32 and an unrestricted access region 34 on the tray body 22. The splice mount 28 and the fiber storage region 24 are provided at the unrestricted access region 34. An optical splitter component 36 is provided at the restricted access location 32. Referring to FIG. 1, an input optical fiber 38 of the optical splitter component 36 extends outwardly from the restricted access region 32 into the unrestricted access region 34. In certain embodiments, the input optical fiber 38 can be routed to the splice mount 28 where the input optical fiber 38 is fusion spliced to a feeder optical fiber 40. It will be appreciated that both the input optical fiber 38 and the feeder optical fiber 40 can have excess optical fiber length 26 that should be effectively managed. As shown as FIG. 1, the excess optical fiber length 26 is routed in a fiber loop path 42 defined by the fiber storage region 24. The fiber loop path 42 is defined around a central hub 44 of the tray body 22 and a generally racetrack-shaped boundary 46 that circumscribes the central hub 44. Fiber management tabs 48 overhang the fiber loop path 42 and function to retain/capture the excess optical fiber length 26 within the fiber storage region 24.

As shown at FIG. 1, access to the restricted access region 32 is restricted by a top cover 50 secured to the tray body 22. In certain embodiments, the cover 50 is connected to the tray body 22 by means such as a weld (e.g., an ultrasonic weld), an adhesive (e.g., an epoxy), conventional fasteners, security fasteners such as screws that require a unique key or tool to remove such fasteners, or other structures. In certain embodiments, the cover 50 is permanently connected to the tray body 22. By "permanently connected", it is meant that either the tray body 22 or the cover 50 need be broken or destroyed to remove the cover 50 from the tray body 22, or that a special tool is needed to remove the cover 50 from the tray body 22. In other embodiments, as shown at FIG. 3, the fiber management tray 20 can include a tamper indicator 104 (e.g., a seal, tape, etc.) for providing an indication as to whether the cover 50 has been removed. For many applications, unauthorized removal of the cover 50 can be used as a basis for voiding a warranty related to the optical splitter component 36. In still other embodiments, access to the restricted access region 32 can be restricted by embedding or covering the optical splitter component 36 (e.g., a body of the splitter component as well as splitter outputs) in a curable securing medium used to secure the optical splitter component 36 to the tray body 22 such that the curable securing medium itself is a cover.

In FIG. 2, the cover 50 has been removed from the tray body 22 to reveal the underlying optical splitter component 36. As shown at FIG. 2, the optical splitter component 36 includes a splitter body 52 and splitter output fibers 54 (e.g., drop fibers) that extend outwardly from the splitter body 52. It will be appreciated that the splitter body 52 can include a protective outer casing or sleeve that surrounds and protects an internal optical splitter that provides one-to-many optical splitting between the input optical fiber 38 and the splitter output fibers 54. In certain embodiments, the optical splitter component 36 can provide a 1×2 split, a 1×4 split, a 1×8 split, a 1×16 split, a 1×32 split, a 1×64 split, etc. In certain embodiments, the optical splitter component 36 can include an optical power splitter that evenly splits the power of an optical signal from the input optical fiber 38 to the splitter output fibers 54. In other embodiments, the optical splitter component 36 can include a wavelength division multiplexer that splits optical signals provided from the input optical fiber 38 to the splitter output fibers 54 based on wavelength.

Referring back to FIG. 1, the restricted access region 32 includes a first portion 32A that restricts access to the splitter body 52 and a second portion 32B that restricts access to the splitter output fibers 54. The splitter output fibers 54 extend along a fiber routing path 58 that extends a first distance D1 measured from the splitter body 52 to a fiber exit/entrance location 60 of the tray body 22. In certain embodiments, the second portion 32B of the restricted access region 32 extends along a majority of the first distance D1. In a preferred embodiment, the second portion 32B of the restricted access region 32 extends substantially the entire first distance D1 between the splitter body 52 and the fiber exit/entrance location 60. The term "substantially the entire" means all or almost all of the first distance D1.

As shown at FIG. 1, the second portion 32A of the restricted access region 32 extends along a peripheral boundary 62 of the tray body 22. The peripheral boundary 62 of the tray body 22 is curved and the second portion 32B of the restricted access region 32 has a curvature that matches the curvature of the peripheral boundary 62. The second portion 32B of the restricted access region 32 is defined between the peripheral boundary 62 of the tray body 22 and a portion of the racetrack-shaped boundary 46 of the fiber loop path 42. It will be appreciated that the second portion 32B of the restricted access region 32 is relatively small compared to the overall size of the fiber storage region 24 such that a relatively large amount of storage area is provided for storing the excess optical fiber length 26 corresponding to the feeder optical fiber 40 and the input optical fiber 38. The second portion 32B of the restricted access region 32 protects the splitter output fibers 54 and ensures that the splitter output fibers 54 remain routed along the preferred fiber routing path 58 that extends from the splitter body 52 of the fiber exit/entrance location 60.

Referring still to FIG. 1, the fiber storage region 24 is positioned between the splice mount 26 and the splitter body 52. It will be appreciated that the splice mount 28 is preferably configured for holding/retaining a conventional splice reinforcing sleeve that is mounted over a conventional splice such as a conventional fusion splice. In certain embodiments, the splice reinforcing sleeve can be snap fit or otherwise secured within the splice mount 28. The splice mount 28 and the splitter body 52 are positioned on opposite sides of the fiber storage region 24 with the splice mount 28 being adjacent to the fiber exit/entrance location 60. The fiber exit/entrance location 60 includes a first passage 60A for routing the splitter output fibers 54 from the second portion 32B of the restricted access region 32 out of the tray body 22. It will be appreciated that the splitter output fibers 54 can be routed from the fiber management tray 20 to another tray where the splitter output fibers 54 can be optically coupled to output optical fibers such as drop fibers or subscriber fibers. The fiber exist/entrance location 60 also includes a second passage 60B for routing the feeder fiber 40 into the tray body 22.

In use of the fiber management tray 20, a field technician can route the feeder optical fiber 40 onto the tray body 22 through the second passage 60B of the fiber exit/entrance location 60. From the second passage 60B, the feeder optical fiber 40 can be routed into the fiber storage region 24 and excess length corresponding to the feeder optical fiber 40 can be looped around the fiber loop path 42. After looping the excess length of the feeder optical fiber 40 within the fiber storage region 24, an end of the feeder optical fiber 40 is preferably routed by the field technician to the splice mount 28. The field technician can also store excess length corresponding to the input optical fiber 38 of the optical splitter component 36 along the fiber loop path 42. The field technician preferably splices the end of the input optical fiber 38 to the end of the feeder optical fiber 40 and then mounts the splice within the splice mount 28. The field technician can also route the splitter output fibers 54 out of the tray body 22 through the passage 60A. The splitter output fibers 54 can then be routed to another tray where the splitter output fibers 54 are spliced to corresponding subscriber fibers.

Figure 4:
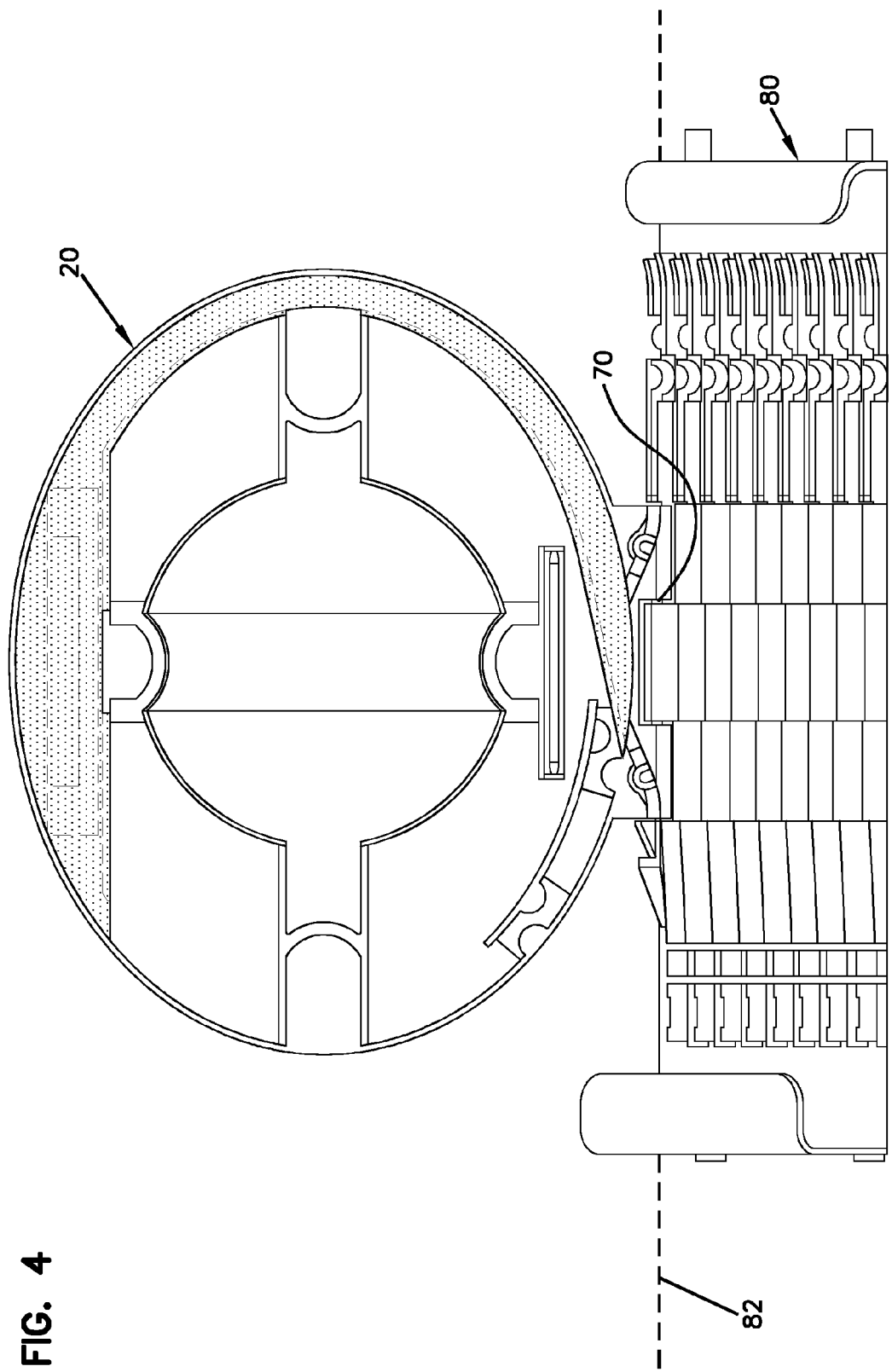
FIG. 4 shows the fiber management tray of FIG. 1 pivotally connected to a modular mounting plate adapted for connection to a frame or other structure.

Referring again to FIG. 1, the tray body 22 includes a hinge location 70 positioned adjacent to the fiber exit/entrance location 60. The hinge location 70 is depicted as a hinge pin. As shown at FIG. 4, the hinge location 70 can be used to pivotally connect the fiber management tray to a corresponding modular mounting plate 80 (e.g., a mounting base, a mounting member, a groove plate, etc.). The modular mounting plate 80 can be configured to be attached to a mounting system (e.g., a universal mounting system) including a frame or other structure having a predetermined connection interface that corresponds to the mounting plate 80. It will be appreciated that the modular mounting plate 80 is configured to receive a plurality of the fiber management trays 20 within each of the fiber management trays being pivotally movable relative to the modular mounting plate 80. For example, each of the fiber management trays 20 can be free to pivot about its own independent pivot axis 82 (see FIG. 1) defined by the hinge location 70. In certain embodiments, both fiber management trays 20 of the type described herein and dedicated splice trays not equipped with splitters can be mounted to the modular mounting plate 80.

Referring to FIG. 2, the tray body 22 has an oblong shape when viewed in plan view. The tray body 22 defines a major dimension M1 that extends along a major axis 100 of the tray body 22 and a minor dimension M2 that extends along a minor axis 102 of the tray body 22. The major and minor axes 100, 102 are perpendicular relative to one another. The splitter body 52 and the splice mount 28 are positioned on opposite sides of the major axis 100 and are bisected by the minor axis 102. The passages 60A, 60B are defined at oblique angles relative to the minor axis 102.

In general, the present disclosure relates to a fiber management tray having both an optical splitter component and an optical splice component provided thereon. The fiber management tray is provided with structure that provides a clear demarcation boundary between the splitter component and the remainder of the fiber management tray. In this way, a field technician is provided with a clear indication that the splice component should not be accessed. The tray can also include a barrier that prevents the splitter component from being accessed in the field. Thus, field access is limited to the remainder of the fiber management tray which includes the splice location and a fiber storage and management region. The integrated configuration of the fiber management tray provides dual functions on one tray while still providing protection for the splitter component.

PARTS LIST

Fiber management tray 20
Tray body 22
Fiber storage region 24
Excess optical fiber length 26
Splice mount 28
Optical splice 30
Restricted access region 32
First portion of restricted access region 32A
Second portion of restricted access region 32B
Optical splitter component 36
Input optical fiber 38
Feeder optical fiber 40
Fiber loop path 42
Central hub 44
Racetrack-shaped boundary 46
Fiber management tabs 48
Top cover 50
Splitter body 52
Splitter output fibers 54
Fiber routing path 58
First distance D1
Fiber exit/entrance location 60
First passage 60A
Second passage 60B
Peripheral boundary 62
Hinge location 70
Modular mounting plate 80
Pivot axis 82
Major dimension M1
Major axis 100
Minor dimension M2
Minor axis 102
Tamper indicator 104

The invention claimed is:

1. A fiber management tray comprising: a tray body defining a fiber storage region for storing excess optical fiber length, the tray body also including a splice mount for mounting at least one optical splice, wherein the fiber management tray includes a restricted access region and an unrestricted access region on the tray body, the splice mount and the fiber storage region being provided at the unrestricted access region, and an optical splitter component being provided at the restricted access region, wherein the optical splitter component includes a splitter body and splitter output fibers that extend outwardly from the splitter body, and wherein the restricted access region includes a first portion that restricts access to the splitter body and a second portion that restricts access to the splitter output fibers, wherein the tray body includes a fiber exit/entrance location, wherein the splitter output fibers extend along a fiber routing path that extends a first distance measured from the splitter body to the fiber exit/entrance location, and wherein the second portion of the restricted access region extends along a majority of the first distance.

2. The fiber management tray of claim 1, wherein an input optical fiber of the optical splitter component extends outwardly from the restricted access region into the unrestricted access region.

3. The fiber management tray of claim 1, wherein the second portion of the restricted access region extends substantially the entire first distance between the splitter body and the fiber exit/entrance location.

4. The fiber management tray of claim 1, wherein the second portion of the restricted access region extends along a peripheral boundary of the tray body.

5. The fiber management tray of claim 4, wherein the second portion of the restricted access region is position between the peripheral boundary of the tray and the fiber storage region.

6. The fiber management tray of claim 1, wherein the second portion of the restricted access region is curved.

7. The fiber management tray of claim 1, wherein the fiber storage region defines a fiber loop path.

8. The fiber management tray of claim 1, wherein the fiber storage region is positioned between the splice mount and the splitter body.

9. The fiber management tray of claim 1, wherein the splice mount is positioned adjacent to the fiber exit/entrance location.

10. The fiber management tray of claim 1, wherein the tray body includes a hinge location at which the tray body pivotally connects to a tray mounting plate, wherein the hinge location is positioned adjacent to the fiber exit/entrance location, wherein the tray body has an obround shape when viewed in plan view, wherein the tray body defines a major dimension that extends along a major axis of the tray body and a minor dimension that extends along a minor axis of the tray body, wherein the major and minor axes are perpendicular relative to one another, and wherein the splitter body and the splice mount are positioned on opposite sides of the major axis and are bisected by the minor axis.

11. The fiber management tray of claim 1, wherein the splitter component is an optical power splitter or a wavelength division multiplexer.

12. The fiber management tray of claim 1, wherein access to the restricted access region is restricted by a cover secured to the tray body.

13. The fiber management tray of claim 1, wherein access to the restricted access region is restricted by a cover secured to the tray body, and wherein the cover is either permanently connected to the tray body or the fiber management tray includes a tamper indicator for providing an indication as to whether the cover has been removed.

* * * * *